United States Patent
Stiegemeier et al.

(10) Patent No.: US 6,192,381 B1
(45) Date of Patent: Feb. 20, 2001

(54) SINGLE-DOCUMENT ACTIVE USER INTERFACE, METHOD AND SYSTEM FOR IMPLEMENTING SAME

(75) Inventors: Mark R Stiegemeier, Park City; Cory L. Hacking, St. George, both of UT (US)

(73) Assignee: MEGG Associates, Inc., Richmond, VA (US)

(*) Notice: Under 35 U.S.C. 154(b), the term of this patent shall be extended for 0 days.

(21) Appl. No.: 09/165,354

(22) Filed: Oct. 2, 1998

Related U.S. Application Data

(60) Provisional application No. 60/061,025, filed on Oct. 6, 1997.

(51) Int. Cl.[7] ............................. G06F 15/00; G06F 17/00
(52) U.S. Cl. ........................ 707/505; 707/506; 707/508; 707/500
(58) Field of Search ..................... 707/505, 504, 707/506, 507–508, 526, 530–531, 521, 500, 908; 345/433, 326, 333, 335

(56) References Cited

U.S. PATENT DOCUMENTS

| | | | |
|---|---|---|---|
| 5,043,891 | 8/1991 | Goldstein et al. | 364/419 |
| 5,267,155 | 11/1993 | Buchanan et al. | 364/419.14 |
| 5,530,961 | 6/1996 | Janay et al. | 345/334 |
| 5,619,685 | 4/1997 | Schiavone | 703/20 |
| 5,806,071 | 9/1998 | Balderrama et al. | 709/104 |
| 5,835,712 | 11/1998 | DuFresne | 709/203 |
| 5,900,002 | * 5/1999 | Bottomly | 707/517 |
| 5,924,109 | * 7/1999 | Ackerman et al. | 707/531 |
| 5,963,967 | * 10/1999 | Umen et al. | 707/513 |
| 6,026,433 | * 2/2000 | D'Arlach et al. | 709/217 |

* cited by examiner

*Primary Examiner*—Joseph H. Feild
*Assistant Examiner*—Alford W. Kindred
(74) *Attorney, Agent, or Firm*—Gilberto M. Villacorta; Pepper Hamilton LLP

(57) ABSTRACT

A data management system user interface allows users to enter, store, retrieve, and display multiple, related groups of information in a single document. The interface loads document data into a separate template which defines various fields, and the interface determines the fields that should be displayed based on the information entered by the user. The user enters an unlimited amount of data into each field, thus creating a free-flowing document, and the user can create groups of entries for each field. The interface also contains a data validation and error correction feature, that provides automatic correction, prompts for manual correction, and allows the user to save a draft document with a list of errors for future correction at a later date.

23 Claims, 10 Drawing Sheets

```
┌─────────────────────────────────────────────────────────┐
│  001 - Personnel                              _ □ ×     │
│ File  Edit  Help                                        │
│ 🖫 Save and Close  | 🔍 🖶 | ✂ 📋 📋 | 📄 A ▾ |          │
│ Personnel  Additional Information | Absences | Training | Discipline History | Performance │
│ ┌─────────────────────────────────────────────────────┐ │
│ │ Employee Detail        ╱─556                        │ │
│ │  DOB  1/28/60      Age  38       SSN  528-99-0001   │ │
│ │  Height  5'11"     Weight  180lbs                   │ │
│ │  Sex  M - Male              Race  B - Black         │ │
│ │  Blood Type  x _ _ _ _ _ _ _ _ _ _ _ _              │ │
│ │  Address  1029 Albert St                            │ │
│ │  CSZ  Richmond, VA 23294         County             │ │
│ │  Country  USA - United States of America            │ │
│ │  Home Phone  555-1234         Work Phone            │ │
│ │  Pager Number                 Mobile Phone          │ │
│ │  DLN                          DLN Expiration        │ │
│ │                                                     │ │
│ │ Emergency Contact Detail                            │ │
│ │    Name                          DOB                │ │
│ │    Address                                          │ │
│ │    CSZ                           County             │ │
│ └─────────────────────────────────────────────────────┘ │
│ ⓧ Blood Type is invalid.                                │
│                                                         │
│                                          |CAPS|NUM|     │
└─────────────────────────────────────────────────────────┘
```

CUSTOMER INFORMATION
NAME _____
TYPE OF ENTITY _____
ADDRESS _____ CSZ _____
TAX ID NUMBER _____ ACCOUNT NUMBER _____
SPOUSE NAME _____ DOB _____
CONTACT NAME _____
PHONE _____ FAX _____ PAGER _____

FIG. 6B

CUSTOMER INFORMATION
NAME _____
TYPE OF ENTITY _____

FIG. 6C

CUSTOMER INFORMATION
NAME JOHN SMITH
TYPE OF ENTITY I-INDIVIDUAL
ADDRESS _____ CSZ _____
ACCOUNT NUMBER _____ DOB _____
SPOUSE NAME _____
PHONE _____ FAX _____ PAGER _____

FIG. 6D

CUSTOMER INFORMATION
NAME ACME AGENCY
TYPE OF ENTITY N- NONPROFIT ORGANIZATION
ADDRESS _____ CSZ _____
TAX ID NUMBER _____ ACCOUNT NUMBER _____
CONTACT NAME _____
PHONE _____ FAX _____

FIG. 7

```
┌─ Case Report ─────────────────────────────────── ─ □ X ─┐
│ File  Edit  Help                                         │
│ 💾 Save and Close │ 🔍 🖨 │ ✂ 📋 📋 │ 📄 A ▾ │           │
│ ┌──────┬──────┬──────┬──────┬──────┐                    │
│ │      │      │      │      │      │                    │
│ ├──────┴──────┴──────┴──────┴──────┴─────────────────┐  │
│ │ Administrative                                    ▲ │  │
│ │ Case Report  97812435                               │  │
│ │ Subject  Arrest of Jane Doe                         │  │
│ │ Entered On  3/5/97        Entered By  A205 - JONES, AARON │
│ │ Approved On  3/6/97       Approved By  38 - WHITE, CLIFFORD │
│ │ Agency  P-PD              Report Type  A - Arrest Report │
│ │ Reported On  3/5/97       Reported By  25 - JONES, AARON │
│ │ Occurred On  3/4/97       Occurred Between  3/5/97  │
│ │ Location  100 W. Center St.       Grid  A7    Geo Code  15 │
│ │ Division  Patrol      Call Source  P - Phone        │
│ │ Connecting Reports _____      Disposition  2 - Arrest │
│ │ Clearance Basis   E - Juvenile/No Custody         ▼ │  │
│ │ ◄                                                 ► │  │
│ ├─────────────────────────────────────────────────────┤  │
│ │ ⓘ You must create an offense                        │  │
│ │                                                     │  │
│ │                                                     │  │
│ │                                                     │  │
│ └─────────────────────────────────────────────────────┘  │
└──────────────────────────────────────────────────────────┘
```

801 — Case Report
802 — Entered On
803 — (right side annotation)
804 — You must create an offense

FIG. 8

SINGLE-DOCUMENT ACTIVE USER INTERFACE, METHOD AND SYSTEM FOR IMPLEMENTING SAME

This application claims priority from U.S. provisional patent application No. 60/061,025, filed Oct. 6, 1997, incorporated herein by reference.

BACKGROUND OF THE INVENTION

1. Field of the Invention

The present invention generally relates to a user interface, process and/or architecture for a computer implemented and/or assisted system for managing varying types of data, and more particularly, a user interface, process and/or architecture that allows or provides users the ability to enter, store, retrieve, and display multiple, related groups of information in a single document.

2. Background of the Related Art

In the latter half of the twentieth century, computer systems have proven to be a powerful tool for managing large quantities of data in many different aspects of everyday life. In particular, computer-implemented data management software has given a wide variety of users an easy way to manage both numerical and narrative information. For example, software is available that allows bank personnel to manage customer account information such as deposits, withdrawals, earnings, and fees associated with individual accounts. Many types of business-related software allow companies to manage business information such as personnel records, transaction data, customer records, and financial information.

Data management programs typically contain user interfaces that display a document and contain various fields for user input. Each user input field typically represents a different category of information, and the user typically enters one piece of information per field. For example, a business application may define a "document" as an invoice, and the user interface may display fields where the user may enter products of sale that are accounted for in that invoice. The programs and their interfaces may also contain limited data validation features, such as options that check the spelling of user entries and prompts that advise the user if the format of the user's entries are improper (e.g., if the user entered a letter in a field for which only numbers are valid, the interface may prompt the user to retype the entry).

However, the prior art data management software presents several disadvantages. In particular, the user interfaces used by the existing data management software are inflexible and lack a means to display complex, interrelated data in a manner that hides the data complexity from the user. The prior art data management system user interfaces typically require all data to be displayed in a single display format or "template," and each field must be displayed regardless of whether every individual field is necessary or appropriate for the data contained in the document. Further, existing data management system user interfaces do not allow users to enter multiple instances of data in a single field.

In addition, existing data management systems have defined field sizes, and users are either restricted in the amount of data that can be entered in a field, or required to use forms that include large blank spaces to accommodate large entries regardless of whether such spaces are needed. Finally, the data validation features of existing data management system user interfaces are limited in that they may correct minor items such as typographical errors, or they may prompt the user to re-enter an item, but they contain no means to allow the user to correct, validate, or enter additional information by retrieving it from a another database on a network, and they do not allow the user to save a "draft document" so that the user can enter corrections and missing information and validate the document information at a later date.

If a user interface that avoids these disadvantages were available, data management software could have many new and useful applications. For example, law enforcement officers could use computers or hand-held electronic devices to generate complete case reports in the office, at home, in their car, or at the scene. In addition, the software driving the user interface could automatically prompt the officers to enter only the specific information necessary to document the particular type of incident.

Accordingly, we have determined that it is desirable to provide a user interface, method and/or architecture that displays complex, interrelated data in a manner that does not reveal its complexity to the user.

We have also determined that it is desirable to provide a user interface, method and/or architecture that stores the data and the display template separately, and which links the data with the template when the display is activated.

We have also determined that it is desirable to provide a user interface, method and/or architecture that automatically selects the data fields that should be displayed based on the data that the user enters.

We have also determined that it is desirable to provide a user interface, method and/or architecture that allows users to create free-flowing forms for varying sizes of entered data.

We have also determined that it is desirable to provide a user interface, method and/or architecture that allows users to enter multiple instances of data in a single field.

We have also determined that it is desirable to provide a user interface, method and/or architecture that allows the user to correct, validate, and/or enter additional information by retrieving it from a another database on a network or by saving a "draft document" and entering corrections, missing information and/or validating the information at a later date.

SUMMARY OF THE INVENTION

It is therefore a feature and advantage of the present invention to provide a user interface, method and/or architecture that displays complex, interrelated data in a manner that does not reveal its complexity to the user.

It is another feature and advantage of the present invention to provide a user interface, method and/or architecture that stores data and templates separately and links the data with an appropriate template when the data is displayed.

It is another feature and advantage of the present invention to provide a user interface, method and/or architecture that automatically determines the data fields that should be displayed based on the data that the user enters.

It is another feature and advantage of the present invention to provide a user interface, method and/or architecture that allows the user to create free-flowing forms.

It is another feature and advantage of the present invention to provide a user interface, method and/or architecture that allows the user to enter multiple instances of data in a single field.

It is another feature and advantage of the present invention to provide a user interface, method and/or architecture that allows the user to correct, validate, and/or enter additional information by retrieving it from another database on a network, or by saving a "draft document" and entering corrections, missing information and/or validating the information at a later date.

The above and other features and advantages are achieved through the use of a novel data management system user interface, method and/or architecture as herein disclosed.

Real world computer information often contains a complex web of relationships and data. As electronic documents become more complex, these relationships are easily overlooked. The present invention allows complex data to be stored and retrieved more easily than traditional client/server methods. The present invention is a collection of unique technologies that solve the problem of gathering, viewing, printing, managing, and storing complex information across networks and computer systems. This provides application programmers with an advantage in system development by allowing them to focus their efforts on the product of the system, the output, rather than the form in which the information is gathered.

The present invention is composed of several shared, interactive components:

Application

Documents

Transaction Services

Document Managers

The Application advances the means by which developers consolidate and control the collection, manipulation and management of data. These technologies combine to create a system that is easy to develop with, use, and maintain. The Application can be programmed from a variety of application development environments including C++, Visual Basic, Delphi, Java, Visual Basic Script, Active Server Pages, Web Servers, etc.

Application Documents are a compound collection of template information and subject data. Transaction Services provide a single point of contact through which the Application communicates to other services on the network, standing as a proxy between the Application and the various document managers and other services. When a user wants to edit, view, or print a document, the Application ensures that the latest version of the template exists locally. This includes the latest versions of any associated, dependent programs. If a newer version is available, the system automatically downloads the updated component and properly registers all of its parts with the client operating system, and a request is made through transaction services to the document manager.

A Document Manager is built for each type of document. This server application is responsible for managing access to the document and managing the storage and retrieval of the document to and from document repositories (e.g., a file server, database server or other mass storage device). It is important to note that information can be extracted from any number of sources and combined into a single document. Document managers are also responsible for creating and managing the templates containing the view definitions, tables, document structure, etc. They may also provide services specifically designed for the needs of any client script modules.

In accordance with the preferred embodiment of the present invention, a computer system contains one or more input devices, preferably a keyboard and a mouse; a display device such as a screen; active memory (such as random access memory) within which portions of a program reside while the computer runs the program; and a storage means such as a hard disk, floppy disk, removable drive, or network server. The user employs a "container application" such as Microsoft Windows Explorer or File Manager to load a "document" (i.e., a data file) from the storage means into the computer's active memory. The present invention then retrieves a template and a client script program from the storage device. The template contains the format instructions pursuant to which the computer displays the document on the display device.

The display includes various fields as defined by the template, and the user uses the input devices to enter additional data into the document fields. As the user enters data into the document, the client script program validates the entries by performing functions such as spell checking and correction, field size verification, and linking of entered data with other data that is maintained in either active memory or on a storage means or remote device. The invention automatically adds or removes fields to or from the display based on the information which the user enters in previous fields. In addition, if the user enters multiple items in a single field, the method creates groups of information within that single field.

In accordance with another embodiment of the invention, a computer readable tangible medium is provided that stores the process thereon, for execution by the computer. In accordance with another embodiment of the invention, a computer system is provided that stores the processes described herein.

In accordance with another embodiment of the invention, a computer readable tangible medium is provided that stores an object thereon, for execution by the computer.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

The scope of the invention, together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter which illustrate preferred embodiments of the invention.

BRIEF DESCRIPTION OF THE DRAWINGS

FIG. 5b illustrates how the template formats an exemplary document on a display device, wherein the document includes such features as fields of entry as modified by the client script program;

FIGS. 6a–6d illustrate the present invention's ability to display and/or hide data fields in response to user-entered data;

FIG. 7 illustrates the "grouping" feature of the present invention in an exemplary document on a display device;

FIG. 8 illustrates an exemplary application of the present invention to law enforcement data management.

NOTATIONS AND NOMENCLATURE

Figure 1:
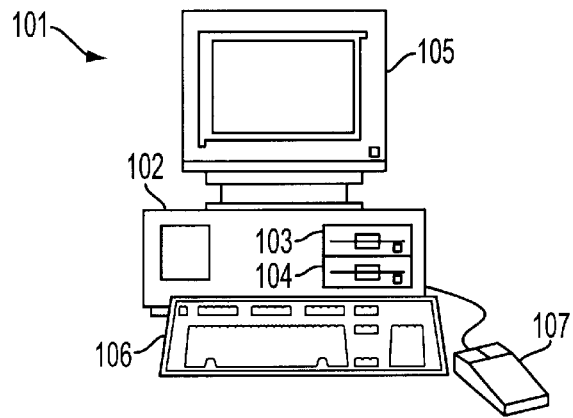
FIGS. 1 and 2 illustrate a computer of a type suitable for implementing and/or assisting in the implementation of the processes described according to the present invention.

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

The present invention also relates to an apparatus for performing these operations. This apparatus may be specially constructed for the required purpose, or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct a more specialized apparatus to perform the required method steps. The required structure for a variety of these machines will appear from the description given.

DESCRIPTION OF THE PREFERRED EMBODIMENT OF THE INVENTION

I. Overview

Real world computer information often contains a complex web of relationships and data. As electronic documents become more complex, these relationships are easily overlooked. The present invention allows complex data to be stored and retrieved more easily than traditional client/server methods. The present invention is a collection of unique technologies that solve the problem of gathering, viewing, printing, managing, and storing complex information across networks and computer systems. This provides application programmers with an advantage in system development by allowing them to focus their efforts on the product of the system, the output, rather than the form in which the information is gathered.

The system is composed of several shared, interactive components:

Application

Documents

Transaction Services

Document Managers

The Application advances the means by which developers consolidate and control the collection, manipulation and management of data. These technologies combine to create a system that is easy to develop with, use, and maintain. The Application can be programmed from a variety of application development environments including C++, Visual Basic, Delphi, Java, Visual Basic Script, Active Server Pages, Web Servers, etc.

Additionally, the uniformity of data collection that is provided by the Application user interface reduces training and retraining time. Users are able to enter and edit information faster, resulting in greater business productivity. The Application introduces a new user interface model for entering information, which presents a consistent and simple interface to the user regardless of the complexity of the data. As information is entered into the system, the user interface adjusts to the amount of the data entered. Read-only documents can display in a different form than the data entry view, giving the ability to make the interface fast and easy to use.

Developers traditionally spend a large amount of time placing prompts, labels and data fields on data entry forms and ensuring that all graphical objects line up property. The Application forms are free flowing, in much the same way as paragraphs of text on a page. Each group can be expanded to show the associated fields. Also, traditional Grid views may be embedded within any group. A field may be used to enter and/or display text and/or images. Thus, complex structured data can be easily presented to the user.

In an effort to increase the readability of the document being edited, the Application only displays control or option boxes and buttons on the currently active field. Prompts that allow a restricted set of values can be associated with a table that contains the list of allowed values and descriptions. In addition to the traditional "drop-down list" view of the possible selections, the Application will search for possible matches as the user types. This allows the user to quickly find a value or group of values from large tables.

The Application introduces a new concept in managing data entry errors and emissions. All errors and incomplete data or actions are displayed in the document "To Do" list. Each error must be corrected before the user is allowed to save the document in anything but a draft form. Whenever a data entry error occurs, the prompt data may be underlined in red, and a new To Do item is created. The user, at any point in the entry process, can click on the item to move to the associated prompt where they can fix the problem.

A script module may optionally be attached to any document during the development process. The Application installs and attaches the script module to the document, and it provides control points to allow custom behaviors to be activated during the edit process. For example, a script module might be activated whenever a certain field is changed. The program can then check to see if the data is appropriate for the given circumstances, perform special formatting, or other validation on the data. If necessary, an appropriate To Do item can also be added to the document.

Each document may optionally contain one or more print formats. The Application combines the document data with the print format to create a new printable document. Currently, this document is viewable by Microsoft Word™ or other rich text format (RTF) or other compatible viewer.

The layout manager is responsible for dynamically placing information on the screen. This allows the Application to be used on computers with different screen resolutions as well as different user preferences without special versions of the form needing to be developed. Font sizes may also be adjusted to accommodate different resolutions or users with disabilities.

There are currently two layout models: Free Flow, and Left Aligned. The first mode places prompts and data on the form one right after the other, moving to the next line only when needed. The second mode left aligns all of the prompts so they appear vertically in the window.

The layout manager also accommodates the need to hide or display prompts dynamically. There are times when, based upon data entered, you would like to collect additional information. However, you may not want those fields always displayed. The Application handles this by placing the visible prompts on the screen according to the active layout model.

The Application handles repeating groups of information by displaying summary information in a group header. The Application moves the focus away from developing the front-end data entry form to building refined output reports and printed paper views. The Application handles the process of downloading all of the information necessary to properly edit, view, and print the document. The Application also automatically handles sending the document back to the server when it is complete.

Application Documents are a compound collection of template information and subject data. The Application Template component contains:

Information about the nature of the data that are contained in the Document;

User Interface (UI) view definitions;

Print and print preview definitions;

Data entry and editing validation requirements;

Tables used to assist the user entering data; and

Client scripting code.

All of the control information needed to ensure the completeness and accuracy of the data being collected is contained in the Template. To reduce network traffic, templates are cached on the local computer system. The Application checks that the proper version of the template exists before allowing the user to begin editing. Document view definitions control display and modification of the data but not permanent storage.

This document architecture keeps the data separate from its display and control attributes and from user operations on the subject data. It also allows programs that access the data to do so in a uniform manner, ensuring that the proper data structure is maintained. Multiple views can be attached to documents allowing different users to access documents in ways specific to their individual needs. Documents can be transmitted to other users through traditional email systems. Documents can also be the subject of workflow operations to fulfill specific document management functions.

Transaction Services provide a single point of contact through which the Application communicates to other services on the network, standing as a proxy between the Application and the various document managers and other services. When a user wants to edit, view, or print a document, the Application ensures that the latest version of the template exists locally. This includes the latest versions of any associated, dependent programs. If a newer version is available, the system automatically downloads the updated component and properly registers all of its parts with the client operating system, a request is made through transaction services to the document manager. When a request is filled, a document is created and downloaded to the Application. Once the user is finished with the document, the document is returned to the document manager via transaction services.

A Document Manager is built for each type of document. This server application is responsible for managing access to the document and managing the storage and retrieval of the document to and from document repositories (e.g., a file server, database server or other mass storage device). It is important to note that information can be extracted from any number of sources and combined into a single document. Document managers are also responsible for creating and managing the templates containing the view definitions, tables, document structure, etc. They may also provide services specifically designed for the needs of any client script modules.

Figure 2:
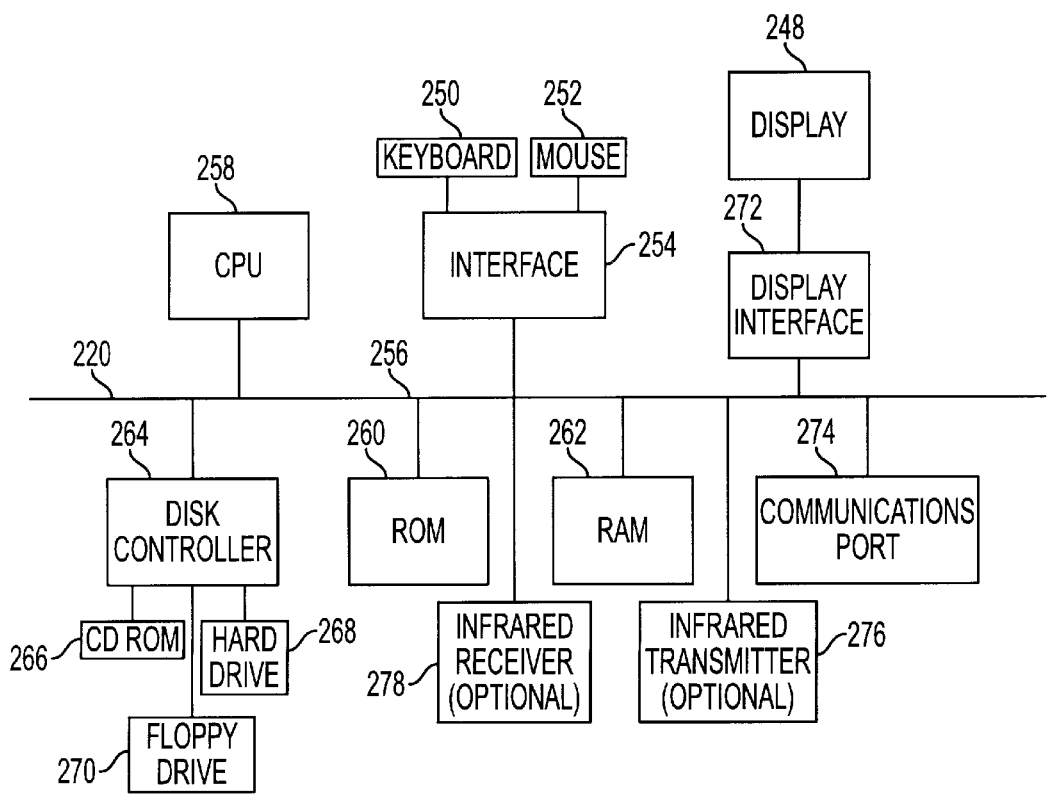

The present invention requires a computer, a computer network, or a portable or hand-held electronic device containing one or more displays, input devices, active memory devices, and storage devices. The devices or components can be interconnected via land line and/or wireless systems and/or other connecting means. FIGS. 1 and 2 illustrate a computer of a type suitable for carrying out the invention. Viewed externally in FIG. 1, a computer system designated by reference numeral 101 has a central processing unit 102 having disk drives 103 and 104. Disk drive indications 103 and 104 are merely symbolic of a number of disk drives which might be accommodated by the computer system. Typically these would include a floppy disk drive such as 103, a hard disk drive (not shown externally), and a CD ROM, digital video disk, or removable drive such as a zip drive indicated by slot 104. The number and type of drives varies, typically with different computer configurations. Disk drives 103 and 104 are in fact options, and for space considerations, may be omitted from the computer system used in conjunction with the processes described herein.

The computer also has a display 105 upon which information is displayed. A keyboard 106 and a pointing device 107 such as mouse will be provided as input devices to interface with the central processing unit 102. To increase input efficiency, the keyboard 106 may be supplemented or replaced with a scanner, card reader, light pen, or other data input device. The pointing device 107 is typically a mouse, although it may optionally be a touch pad control device, track ball device, or any other type of pointing device.

Optionally, and preferably in applications wherein the present invention is used in remote locations such as cars and crime scenes, the computer illustrated in FIG. 1 may be a laptop or similar portable unit, or it may be replaced by a portable electronic device having a display, an input device (such as a keyboard or light pen), memory and a storage device.

FIG. 2 illustrates a block diagram of the internal hardware of the computer of FIG. 1. A bus 256 serves as the main information highway interconnecting the other components of the computer. The CPU 258 is the central processing unit of the system, performing calculations and logic operations required to execute a program. Read only memory (ROM) 260 and random access memory (RAM) 262 constitute the main memory of the computer.

A disk controller 264 interfaces one or more disk drives to the system bus 256. These disk drives may be floppy disk drives such as 270, or CD ROM such as 266, digital video disk (DVD) or removable external drives, or internal or external hard drives 268. As indicated previously, these various disk drives and disk controllers are optional devices.

A display interface 272 permits information from the bus 256 to be displayed on the display 248. Communication with external devices occurs utilizing communication port 274.

In addition to the standard components of the computer, the computer also includes an interface 254 which allows for data input through the keyboard 250 or pointing device such as a mouse 252. As indicated previously, the keyboard may be supplemented or replaced with a scanner, card reader, light pen, or other input device.

It should be noted that the computer illustrated in FIGS. 1–2 is only employed by a preferred embodiment of the present invention. The present invention may optionally be implemented on other electronic data devices that employ input means, display means, and storage means, such as portable or hand-held units, car-mounted devices, and other systems. These electronic devices may be the only means by which the invention is employed, or these devices could be used in conjunction with a conventional computer or computer network such as a local area network, a global network, and/or the Internet, optionally using thin client processing.

Figure 3:
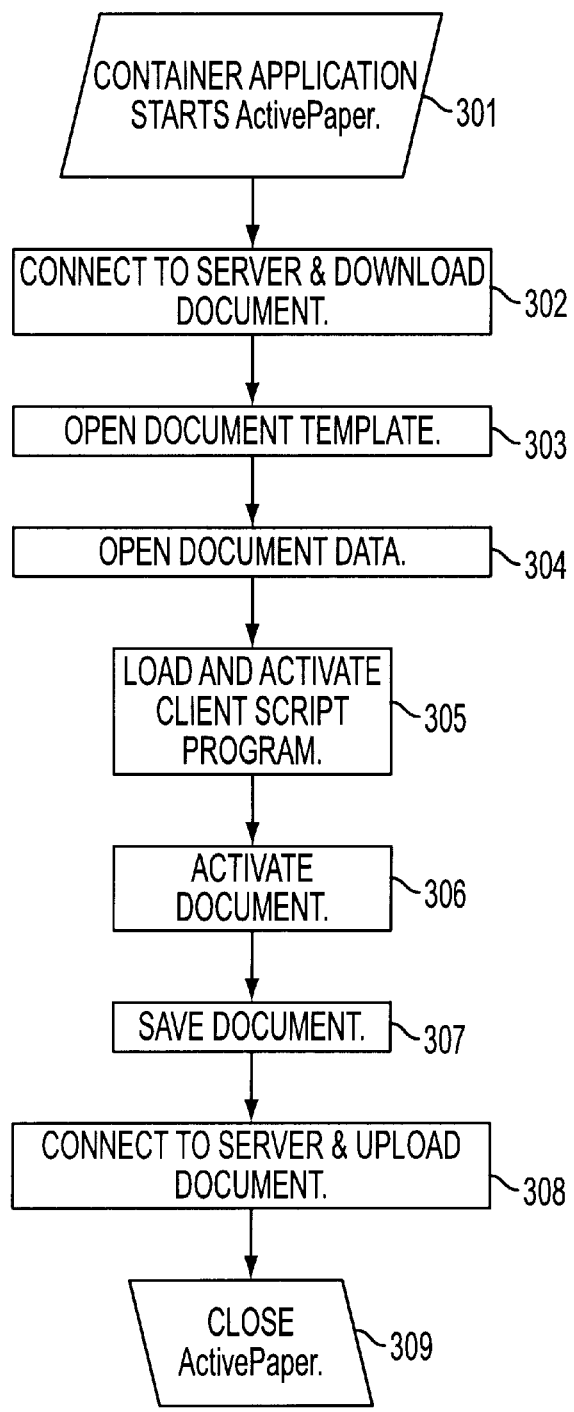
FIG. 3 is a flowchart depicting the process whereby the present invention loads and links a document with a template and a client script program.

FIG. 3 is a flowchart depicting the present invention's overall process of loading and displaying data. Using a computer or other electronic device, in step 301 a "container application" starts the present inventive data management system user interface (which is identified as "ActivePaper" in the figures). The container application may be an operating system or other software that contains a file management feature, such as Microsoft Windows™ with Windows Explorer™, Microsoft Windows™ with File Manager, or word processing, spreadsheet, or web browsing software.

If the computer is part of or connected to a network, in step 302 the computer connects to the server and downloads the document into the computer's RAM or active memory. The connection may be performed via a telephone line, direct cable, wireless transmission, or other communicating means. The network connection may be over a local area network, a global network, and/or the Internet, optionally using thin client processing. When using a computer that is not connected to a network or a device other than a computer, in step 302 the system may retrieve the document from the individual device's memory or from another storage device such as a floppy disk, CD ROM, RAM or zip drive. Optionally, the user may also create a new document instead of downloading a document from the server or the storage device.

Before the system displays the document, the system must retrieve a document template from the server or another storage device, locally or remotely, in step 303. The template contains, for example, instructions for formatting the document data (e.g., names of data fields), and, at the user's option, it may provide for the display of data in either a free-flow or a left-aligned format. The template may optionally contain additional information and/or instructions relating to processing and/or display of information. The process of opening a template is further described in the text referencing FIG. 4 below.

In step 305, the system optionally retrieves a client script program from the server or other storage device. The features of the system client script program are used when the system activates a document in step 306. The process of activating a document is further described in the text referencing FIG. 4 below. The features of the client script program are described in the text referencing FIGS. 6a–6e below.

Once the user has finished working with a document, in step 307 the user may save the document to a storage device such as a hard drive, floppy disk, or removable drive. If the computer is part of a network server, in step 308 the system may then connect to the server using a communicating means and upload the document to the server for storage. Once the process of saving a document, either locally or on a server, is complete, the user may end the method in step 309.

Figure 4:
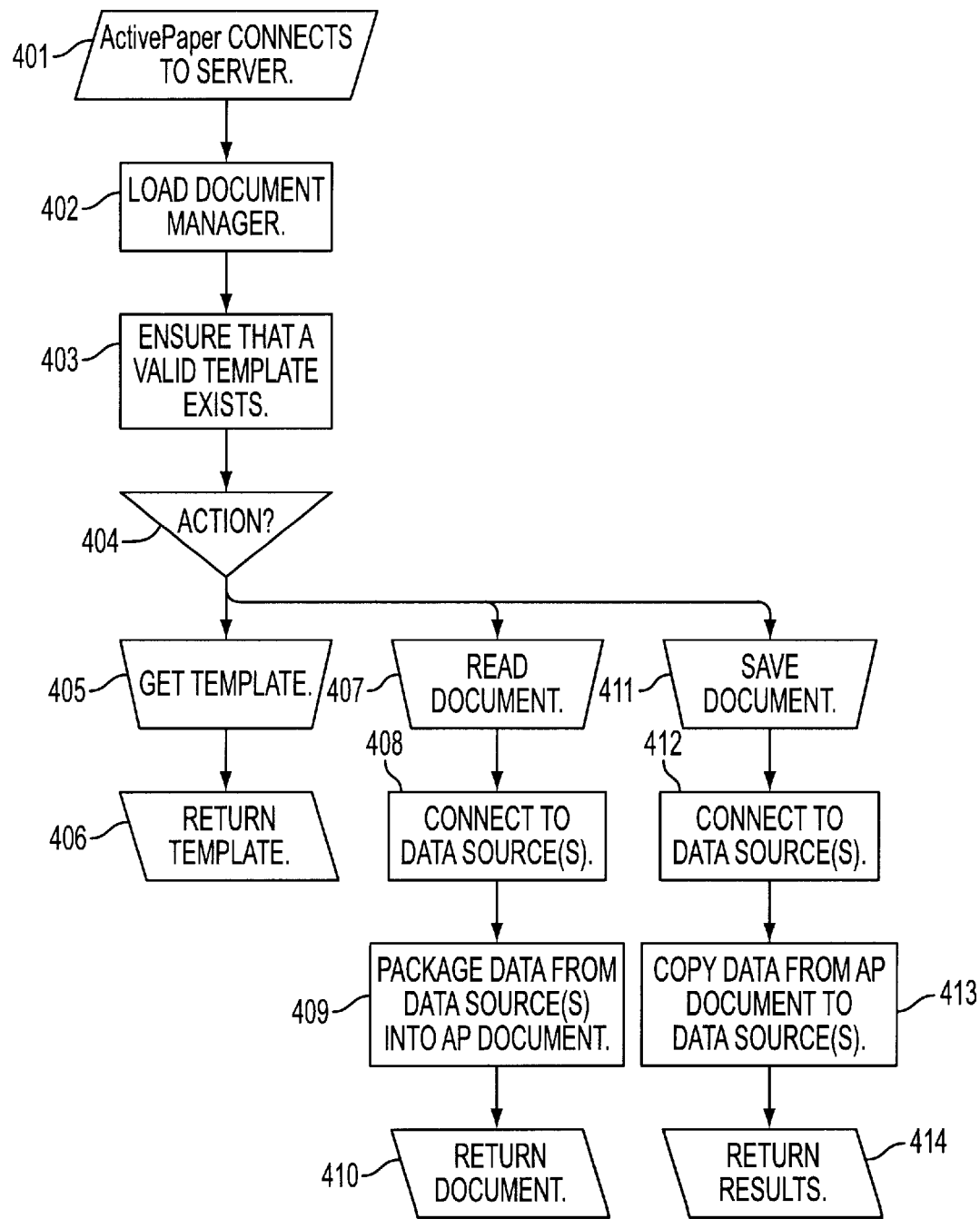
FIG. 4 is a flowchart that provides a more detailed description of the process of linking a document with a template.

The process of opening a template and activating a document is further illustrated in FIG. 4. After the system connects to the server or other storage device in step 401 (which correlates to step 302 in FIG. 3), the system retrieves a document from the server or storage device in step 402. The document may optionally include a code which identifies the appropriate template that will provide the format for displaying the data. The system looks for this code and, if the code exists, in step 403 the system determines whether a template corresponding to that code is available in active memory or on one of the storage devices. If no code is included in the documents, an optional default template may be used. The system then determines an action (step 404) based on whether a valid template exists. For example, if a valid template exists on a storage device but is not yet resident in active memory, the system may retrieve the template from the storage device (step 405) and return it to active memory (step 406). If the template resides in active memory, or if the system has performed steps 405 and 406 to load the document into active memory, the system may then access the document (step 407), extract the data from the document (step 408), format the data in accordance with the template instructions and the client script program (step 409), and display the data in the format as instructed by the template (step 410), resulting in an "activated" document. Any combination of the above steps may also be used.

FIG. 4 also illustrates the process of segregating displayed data from a template before the user closes the program. In step 411, the user optionally elects to save the document to an available local and/or remote storage device. The system then links to that storage device (step 412) and copies the displayed data into a document in the storage device (step 413). The system may notify the user when the storage process is complete (step 414).

Figure 5A:
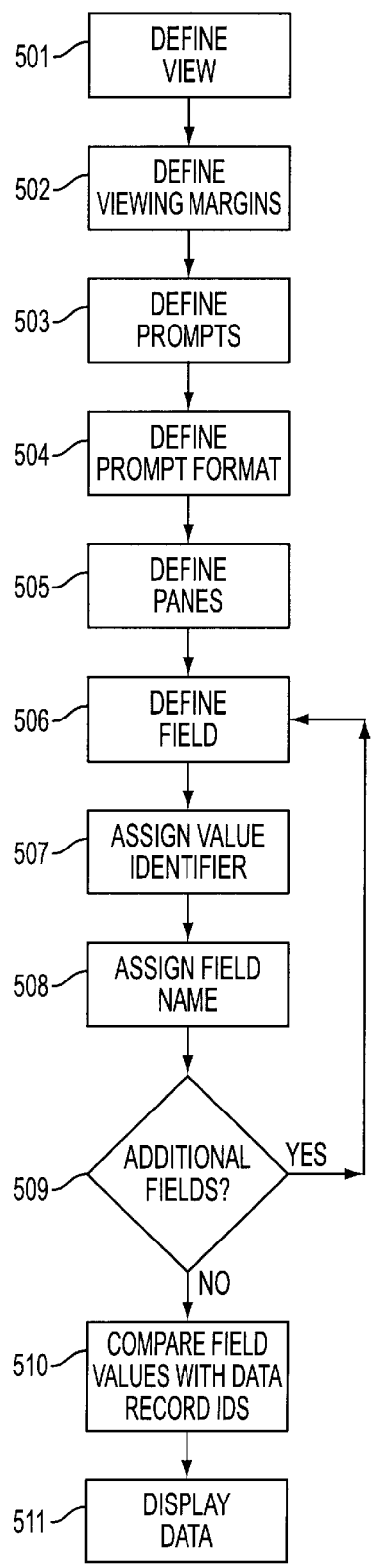
FIG. 5a is a flowchart illustrating the instructions that a template may use to define a display.

The instructions that a template may use to define a display are illustrated in FIG. 5a. The template first defines a view 501, which can be considered as the canvas on which the user interface is painted. Steps which may be taken to define a view include defining the viewing margins 502, and defining a number of prompts or field locations 503. The field locations are points where the user interface receives and displays data. The template also defines the prompt format 504 by specifying how the prompts are displayed on the screen. For example, the format may be such that each prompt is displayed on a separate line, or the format may be a "wrap-around" type whereby each prompt immediately follow the previous prompt. Finally, the template may define panes 505, or subdivisions of the document sized and proportioned to fit the display. Any combination of the above steps may optionally be used to define one or more views.

After the template defines a view, the template then defines one or more fields within the view. Each field fits into a prompt, pointer or field location. The template first defines the field 506 or area on the display where data is displayed upon entry and/or retrieval. The template optionally assigns a value identifier 507 and field name 508 to each field. The process of defining a field and assigning a field value and field name is repeated 509 for each field in the template. When all fields have been defined, the system loads a document into the template by comparing 510 each data record identifier in the documents with the field value identifiers and displaying 511 the data that corresponds to each field. The specific order of the above processes may be altered depending on user need. For example, the template may be used to define the field prior to defining the view. Alternatively, the different areas of the template can be accessed in different orders.

FIG. 5*b* illustrates an example of the user interface by which the present invention displays data in accordance with a template's instructions. In this example, the document contains employee informational data that is displayed in various fields that are specified by a template. For example, the data for a particular employee's date of birth is displayed as instructed or indicated by the template's "DOB" field 551. Similarly, the employee's street address and city, state, and zip code are displayed as instructed or indicated by the template's "Address" 552 and "CSZ" fields 553.

The display illustrated in FIG. 5*b* uses the "wrap-around" format, as is illustrated by the Social Security Number ("SSN") 554 and "Age" 556 fields, which immediately follow the "DOB" field 551 on the same line. Optionally, the template could define the display such that each field is displayed on a new line. It should be noted that the particular field names described in this example are intended only as an illustration, and the system can in fact use any field name depending on the requirements of the user.

As noted above, the present invention includes a client script program which implements two features of the present invention. First, it acts as a layout manager by determining the data fields that should be displayed based on information entered by the user. More specifically, a template defines a document format that includes all possible fields, and the client script program dynamically hides or displays fields depending on the information provided by the user.

An illustration of the client script program layout manager is provided in FIGS. 6*a*–6*d*. In this example, the user interface manages customer data. FIG. 6*a* illustrates a set of all of the template's defined data fields for each customer. The interface may initially display all of these fields, or it may only display an initial field or fields as listed in FIG. 6*b*. Once the user enters information into the system, the client script program hides or displays fields in response to the user's entries. For example, in FIG. 6*c*, the user has entered the name of an individual in the "Customer Name" field, and the system displays all fields that are appropriate for an individual while hiding fields that are not appropriate for an individual (such as fields for "Type of Business", "Tax ID Number", and "Contact Name").

In FIG. 6*d*, the user has entered the name of a nonprofit organization in the "Customer Name" field, and the system displays all fields that are appropriate for that type of entity while hiding fields that are not appropriate for that entity (such as fields for "Spouse Name", "Date of Birth," and "Pager").

The second feature of the client script program is that it allows the user to automatically or manually correct, validate, and/or enter additional information when required. Referring again to FIG. 5, in this example the Social Security Number ("SSN") field 504 requires the user input a nine-digit number. When the user enters information into this field, the client script program will review the entry and return an error message if the entry does not contain nine digits (e.g., the entry contains only eight digits, or the entry contains characters that are not numbers). This error message may appear immediately, and the user may be required to correct the information before proceeding. Alternatively, or in addition, the message may appear in a "To Do list" box 505 within which all error messages are stored for further review and correction by the user. Such error messages may also appear if the user fails to enter data into a required field, as illustrated in the FIG. 5 example, where the user failed to enter information in a "Blood Type" field 507, and the system accordingly returned an error message in the "To Do" list box 505.

The client script program may also optionally provide for automatic formatting of certain types of data. For example, if the user neglects to include dashes, or includes dashes in the wrong place, when entering a Social Security Number into the "SSN" field 504, the system may automatically insert dashes into the entry at the appropriate locations. As another example, the client script program may allow the user to enter abbreviations, such as the simple entry "M" in a field labeled "Sex" 506, which the client script program will recognize as meaning "male".

Figure 6E:
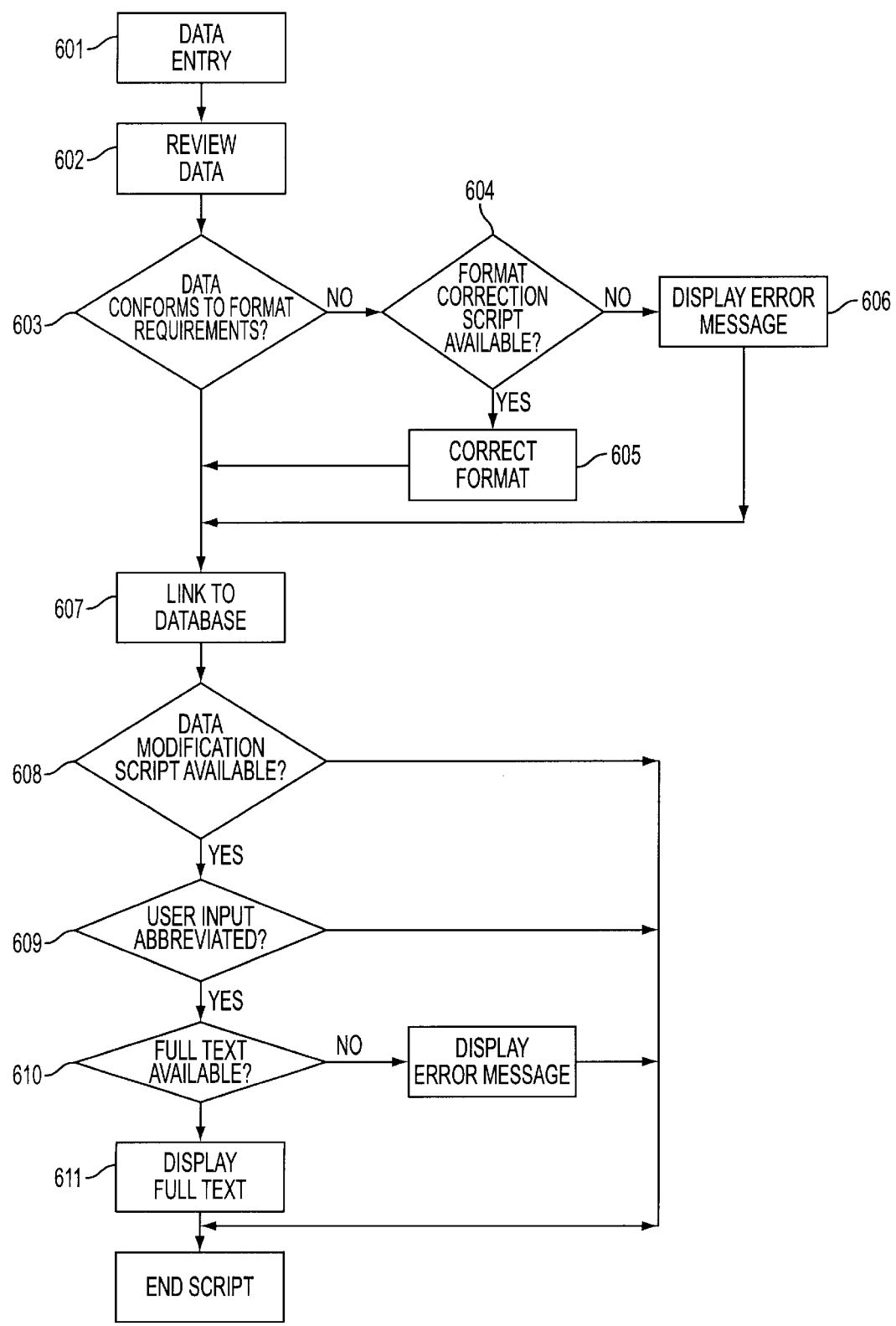
FIG. 6e illustrates the steps which may be taken by the present invention's client script program.

Several of the specific data validation functions that the client script program may perform are illustrated in FIG. 6*e*. Once a user enters data 601 into a field, the client script program may review the data 602 and determine 603 whether it is formatted to fit the requirements of the field. For example, the program may determine whether a field requires that an entry contain a certain number or type of characters (e.g., it may require that the data in a "phone number" field conform to the numeric characters).

If the data does not conform to the required format, the program may modify 605 the data to conform to the format if a format correction script is provided 604 (e.g., in a "phone number" field, the program may insert dashes after the third and sixth digits, or in a "name" field, the program may ensure that the first letter of each name is capitalized) or it may return an error message 606 to the user. The error message may advantageously be included in a "To Do" list for review and correction by the user at a later time. Alternatively, the error may optionally be displayed immediately upon detection of the error, and the user may be required to correct the error before moving to another field.

The program may also refer to a memory-resident database 607, or it may download a database from a server for automatic modification of certain entries. If a data modification script is provided 608, the database may advantageously provide detail to supplement the information entered by the user. For example, the interface may allow the user to enter an abbreviation or a code in a field 609, and the database will provide the full text 611 corresponding to that abbreviation or code if available 610 in the database. If the full text is not available, the program optionally returns an error message 612.

Another feature of the present invention is its "free-form" data entry format, in which field sizes are unlimited, and users are thus not restricted in the size of an entry for a particular field. By way of example, referring again to FIG. 5, the "Address" field 502 may require a very long street name such that the text occupies two or even three lines on the screen. Unlike prior art user interfaces, which simply truncate entries that exceed certain size limitations, the present inventive user interface adjusts to the entry of such data by moving the next data field (in the FIG. 5 example, the next field is the "CSZ" field 503) to a lower point on the display, thus creating forms that are free flowing in much the same way as paragraphs of text on a page.

Another element of the present invention is a "grouping" feature, which allows the user to input multiple entries in a single field. For example, the system may manage employee information such as that illustrated in FIG. 5 for a very large number of employees. Accordingly, a single document may contain an "Employee Name" field, and the document may include the fields illustrated in FIG. 5 for each employee. Unlike other data management user interfaces, which use tables or grids to manage such data, the present invention advantageously manages such data in a single document by maintaining each entry directly after the previous entry, and the user interface displays only those fields corresponding to the entry selected by the user. The system allows the user to enter as many entries into a group as the user desires, and the user is limited only by the memory available on the user's computer, network, or electronic device.

Figure 7:
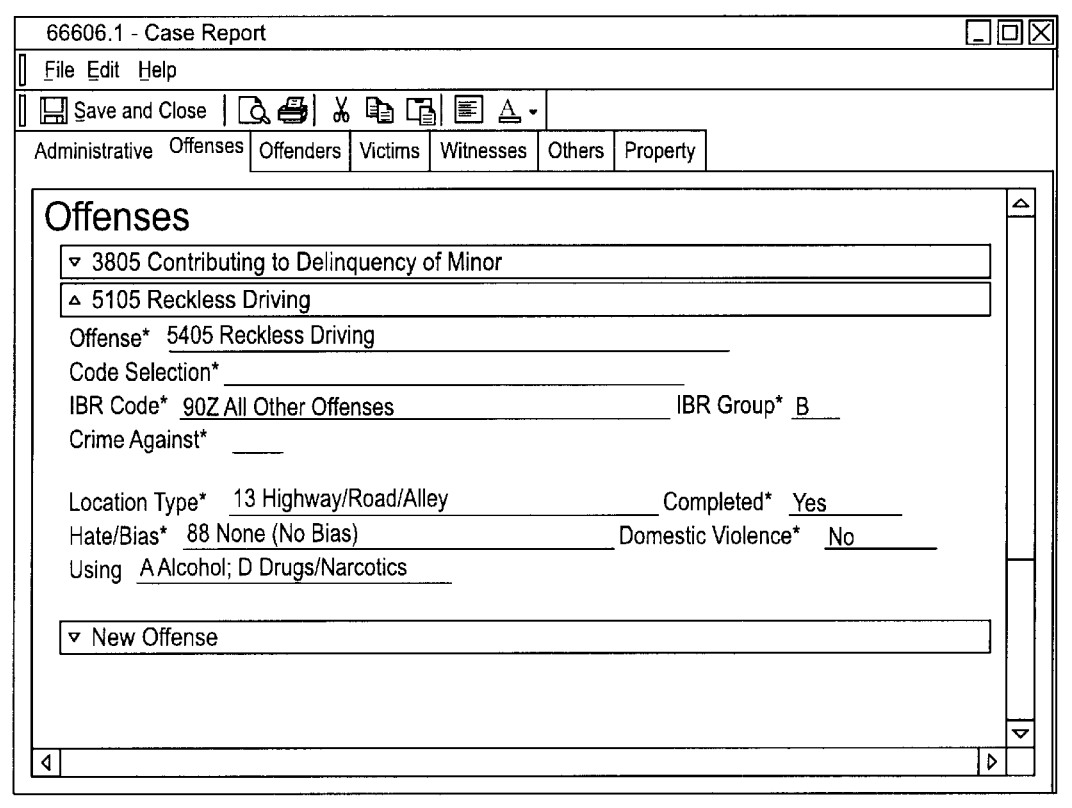

An additional example of the grouping feature is illustrated in FIG. 7. In this example, a group of offenses that may be of interest to a law enforcement officer is included under the heading "Offenses." Detail fields relating to each offense are hidden from the user unless the user specifically asks to view such information. For example, in FIG. 7, the user has used the pointing device or the keyboard to point to a heading describing information about reckless driving, and the system has responded by displaying the group of informational fields that are included under the "Reckless Driving" field.

Once the user has completed entering data into a document, the user will be presented with several options. For example, the user may elect to save the document to an available storage device (such as a floppy disk, hard drive, or zip drive), or the user may print or view a "print preview" of the document. If the "to-do" list contains one or more error messages, the system may prompt the user to correct the errors before saving the document. If the user does not wish to correct the errors at the present time, the user may optionally save a "draft document" which retains the "To Do" list for review by the user at later date.

An additional feature of the present invention is the print preview feature. Because of the unique grouping feature of the present invention, e.g., grouping of multiple offenses, multiple vehicles, traditional printing methods or merge formats do not work very well. A special process is defined according to the present invention which advantageously supports a wide variety of systems. Various prompts are provided, including standard wrapping of same.

Advantageously, the present invention links or utilizes standard word processing programs, such as Microsoft Word™, to design the data or form as it will be printed, and to define these special groups if needed. The present invention then saves the data in a RTF (Rich Text Format) file, or optionally any other standard file, text, graphic and/or image format. The present invention merges the data entered from the user into this standard word processing document, and then uses this word processor to display, print preview and/or print the document.

The print feature of the present invention advantageously provides quick data entry since the user does not have to worry from a developer standpoint of making the screen look exactly like the form to be printed. In accordance with the print feature, a macro or template may be used to fit the data entered in the Application document into that template. A unique aspect of this process is that the additional groups are created in the word processing program, instead of in the Application. Thus, for example, if there are three vehicles to be printed, the user would see the three different vehicles with three separate data records or areas, even though the user previously only defined "vehicle" once in the template. Thus, the user is able to view all three vehicles with the data repeated as appropriate.

An additional feature of the present invention is its ability to display images. These images may be entered by, for example, digitizing the image using a scanner. The present invention then displays the digitized image in a field and store the image along with other data.

II. Example Application

One application of the present inventive data management user interface is in the field of law enforcement, where law enforcement officers may use the system to prepare case reports in their offices, in their cars, or at the scene of an incident. Some important changes have taken place within policing. These include changes in the level of education of officers, the background of officers (no longer often coming from a military service background), the perception of police (media and TV shows), the role of law in policing, and the social roots of the police mandate.

Many observers view police departments as businesses rather than public-service agencies. The police department or sheriff's office budget is a large line item, and police management is being forced to improve its productivity, efficiency, and professionalism. In fact, policing is no longer even a secure monopoly. It is beginning to "compete" with private security firms and community action groups for the responsibility to provide services.

Both criminal and civil law have become determinants of police practice. Once protected from civil suits, police are now liable, and out-of-court settlements and restitution are commonplace. As a result of these changes, the traditional components of the police mandate-commitment to maintaining the collective good, serving with honor and loyalty, and observing tradition-are in conflict with practical obligations, concern for avoiding legal liability, civil liberties, civil suits, and budgetary constraints. The mandate is less tied to society's moral core and increasingly linked to considerations of practical management and administration.

One of the most important trends in policing in the past 25 years is the rising demand for police services. The problem is how to ration and distribute a service to which all have a right, while delivery constraints increase and resources shrink. Continued economic pressure will force agencies to increase automation in an effort to improve the productivity, effectiveness, and safety of the officer on the street. The need to provide officers with mobile computing capability will increase.

Police must serve the information needs of special interest groups and the public at large. Community-policing programs increase the involvement and thus the information requirements of police/community activities. Implementation of the redesigned Federal Bureau of Investigation (FBI) Uniform Crime Reporting (UCR) system—the National Incident Based Reporting System (NIBRS)—is well underway. The only acceptable participation is with an automated system that provides zero-defect data with an easy-to-use data collection interface.

The intent of the recent Federal Crime Bill is to substantially increase the number of law enforcement officers interacting directly with members of the community. The Crime Bill will fuel the adoption and development of new technologies to help state ind local law enforcement agencies in redirecting the emphasis of their activities from reacting to crime to preventing crime.

One embodiment of the present invention is designed to help law enforcement meet the demands created by the issues we've discussed. This is accomplished by providing an application environment where users easily and naturally interact with the system as a part of their daily routine. Data capture is simplified and specific to the work of law enforcement. The system prepares operational and statistical reports, and makes these reports available to all that need access, regardless of location.

Information is key to the focused operation and the overall effectiveness of law enforcement. Technology can be expensive to acquire and maintain. The acquisition of hardware, software, training, installation, maintenance, replacements, and upgrades can add up to a substantial, ongoing investment. In addition, department staff time cannot be overlooked in an overall cost analysis. Long gone are the days of mainframe computer dependence and the associated acquisition and maintenance costs. The personal computer marketplace has surpassed all other competing platforms on a cost/performance basis and will continue to grow and expand with capability and capacity.

The present invention offers the highest function and performance possible while taking advantage of the low-cost commodity-like nature of the PC marketplace. The popularity of home computing and the Internet ease the educational requirements on departments, because new users already are familiar with PC operation. The resulting benefit for law enforcement is higher performance at lower costs-something every government agency is focused on in today's political and business climate.

The present invention provides an attractive, easy-to-learn graphical user interface, along with a versionless client that seldom needs upgrading manually. The present invention tracks and retains all information pertinent to a case folder, including people, property, and any allied documents, plus photograph files and other scanned and electronic files. The database can be queried using powerful industry-standard query tools, and can provide and publish a wide variety of reports and graphs.

As an intranet application, the present invention is built using the same technologies that are making the Internet successful-Transmission Control Protocol/Internet Protocol (TCP/IP), browsers, server-side components, and the like. What this means to the user is a simple and easy-to-use interface, access to the system from virtually anywhere, and increased reliability. For the system administrator, an intranet application is easier to set up and maintain than traditional or client/server database systems.

An exemplary application of the present invention also provides a simple data collection tool for generating complete police case reports. All records are validated as they are written to ensure accuracy and compliance with NIBRS and UCR regulations. Case reports can be written in the office, at home, or even in the car. Entire cases can easily be checked in and out of the system, allowing access to vital supporting information for writing additional case reports and to further an investigation.

Using the present invention's unique technology to collect all and only the information necessary to accurately document an offense, the exemplary application politely prompts for necessary information as the user proceeds. The present invention can print case reports in a format that contains a department logo, color, variable font sizes, and other advanced features associated with word processors. Helpful features such as an automatically maintained to-do list and a detailed Help function make the present invention an easy-to-use tool for everyone. Users are ensured of quick, accurate, and complete case report-writing capability, no matter where they are.

Case reports are designed to meet the requirement for the FBI's summary-based and incident-based reporting programs. The information from the case reports is optionally returned for approval, analysis, and reporting. The present invention can also optionally be deployed as a front end to any existing records management system. All functions, including UCR and NIBRS compatibility, are performed by the front end, while new information collected is passed on. This solution uses a server to provide additional processing for the data collected.

For example, law enforcement officers may carry laptop computers or hand-held electronic data entry devices with them to the scene of a traffic accident, crime, or other incident. To prepare a case report for the incident, the officer may open a document and link to a template associated with that type of incident.

A template for a vehicle accident may contain fields such as vehicle type, license plate number, and vehicle damage. This information may be "grouped" so that the officer can enter such information for one, two, three, or more vehicles. In addition, the officer may enter as much information into each field as required, and the user interface will adjust the document display to allow for such entry. For example, the officer may desire to enter one or more narrative paragraphs into the "vehicle damage" field, and in such a case the system will adjust the display so that the next field simply appears at the end of the "vehicle damage" field.

Figure 9:
FIG. 9 illustrates the present invention's ability to display images.

Continuing this example, for each vehicle, the system may contain fields for the driver name and passenger names. After the officer enters the name of a driver or passenger, the system may display a field for injuries sustained by each such individual, or the system may optionally first display all such fields and hide appropriate fields if, for example, a vehicle contains no passengers. Optionally, the officer may also use a scanner or digital camera to create a digitized photograph of the accident scene. The officer can then enter this digitized image into one or more of the document fields. An example of such a display is illustrated in FIG. 9.

As the officer completes the case report, the system may generate a "To Do" list which identifies errors and omissions in the report. The officer may correct the errors and omissions on the spot, or the officer may save a draft report and retrieve it at a later date for correction. If and when connected to a network, the officer may upload the report to the server, or the officer may simply save the report on a storage device for future use, or for future transfer to a network server.

Another example of how the present invention can be used by law enforcement officers is illustrated by FIG. 8. In this example, an officer has created a report relating to the arrest of a person named Jane Doe. The report includes a "Case Report" field 801, and the data in this field may have been entered by the officer, or it may have been automatically generated by the client script program by connecting to the server and retrieving the next available case report number. The client script program may have also ensured that certain entries are displayed in a consistent format, such as a "month/date/year" format for date entries 802, and the program may retrieve certain information upon the entry of abbreviations, such as the retrieval of an officer name upon entry of the officer's badge number 803. The system also creates a "To Do" list 804 to remind the officer to enter required data in certain fields that the officer may have skipped.

III. Additional Supporting Disclosure

Appendix A contains several charts describing examples of software commands, or actions, that the present inventive user interface may use to complete its tasks. For example, Tables 1 and 2 of Appendix A contain examples of commands used to define the data structure which the present invention uses to store data in memory or on a network server. These commands serve as the template for the data. Table 3 contains various commands that may be used to move data into or take data out of the data structure. Essentially, all data flows into the data structure through these commands.

The commands in Tables 4 and 5 are used to define the fields, or objects that contain data, on the display. Tables 6 and 7 list examples of commands used to create a group, or a collection of items in a field, when the user enters multiple data items within a single field. Tables 8 and 9 contain commands that allow the present invention to store, search, and retrieve data based upon a table, or row and column, format. Tables 10 through 11 contain commands which may be used to define the display, or control the "canvas" on which the user interface is painted.

The invention uses the view commands to attach data to a display. Within each view, the invention may create "panes", or subdivisions representing "tab" controls on the user interface.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

APPENDIX

Schema

A schema object contains the definitions of the data structure. They serve as the template for the data.

TABLE 1

| Methods | |
| --- | --- |
| Sub Add(Field As String) | Adds a field to the schema. |
| Sub Clear( ) | Removes all fields from the schema definition. |
| Sub SaveToFileStream(File As String, Stream As String) | Saves the schema definition to an OLE Structured Storage file. |
| Sub LoadFromFileStream(File As String, Stream As String) | Loads a previously stored schema definition from an OLE Structured Storage file. |

TABLE 1-continued

| Properties | |
| --- | --- |
| Property Schemas As Schemas | Returns a reference to a Schemas object that allows sub Schema objects to be defined. This allows a very complex hierarchical structure to be developed. |
| Property Count As Long | The number of fields in this schema. |

Schemas

A schemas object is a collection of schema objects.

TABLE 2

| Methods | |
| --- | --- |
| Function Add(Schema As String) As Schema | Creates a new schema object and adds it to the collection. |
| Sub Clear( ) | Removes all schema objects from the collection. |
| Properties | |
| Property Item(Key As Variant) As Schema | Returns the schema object identified by the key. |
| Property Count As Long | The number of schema objects in the collection. |

Item

An item takes a Schema reference and creates the appropriate Fields and Groups objects. After a schema object, everything flows through an Item.

TABLE 3

| Methods | |
| --- | --- |
| Sub SaveToFileStream(File As String, Stream As String) | Saves the item definition to an OLE Structured Storage file. |
| Sub LoadFromFileStream(File As String, Stream As String) | Loads a previously stored item definition from an OLE Structured Storage file. |
| Sub ClearData( ) | Clears all data from the item. |
| Sub DEAdvise(Disp As Object) | Receives an OLE automation dispatch interface pointer that is called back by the item whenever changes occur. This allows the support of "Dynamic Events" that are events based upon the names of fields, etc. |
| Sub DEUnadvise(Disp As Object) | Prevents any previously set "Dynamic Event" object from being notified. |
| Properties | |
| Property Schema As Schema | Used to set the schema definition of this object. |
| Property Groups As Groups | This is the default property and returns a reference to a Groups object. |
| Property Parent As Group | Returns the parent object in the hierarchy if this item isn't at the root. |
| Property Data As String | Returns or sets a string representing all the data in the item including all subgroups. |

Field

A field is the object that contains data.

TABLE 4

Methods

| | |
|---|---|
| Sub SetValues(ValueID as Variant, Value as Variant) | Allows both the value and valueID properties to be set without causing multiple changed events. |

Properties

| | |
|---|---|
| Property Value As Variant | The field value. |
| Property ValueID As Variant | Any ValueID associated with this field. ValueID's are used to store database record identifiers from table lookups, etc. |
| Property Key As String | The name of this field. |
| Property Parent As Fields | The fields object that this field is part of. |

Events

| | |
|---|---|
| Event Changed( ) | Fired whenever the value or valueID properties are changed. |

Fields

The Fields object contains a collection of field objects. It allows access through an index or key value.

TABLE 5

Properties

| | |
|---|---|
| Property Item(Key as Variant) As Field | Returns the requested Field object based upon an index or key value. |
| Property Parent As Item | Returns the parent Item object. |
| Property Count As Long | The number of Field objects in the collection. |

Group

A Group object's primary function is to contain a collection of Items as described above.

TABLE 6

Methods

| | |
|---|---|
| Function Add( ) As Item | Adds an Item object to the group. |
| Sub Remove(Index As Long) | Removes an Item from the group given its current index. |
| Sub RemoveAll( ) | Removes ALL items from the group. |

Properties

| | |
|---|---|
| Property Item(Index As Long) As Item | Returns the requested Item object based upon the index or key value. |
| Property Count As Long | The number of Items in the group. |
| Property Key As String | The name or key of the group. |
| Property Parent As Groups | The parent groups collection this object is a member of. |

Events

| | |
|---|---|
| Event AddedItem(NewItem As Item) | Fired when a new item is added to the group. |
| Event RemovedItem(RemovedItem As Item) | Fired when an item is removed from the group. |
| Event SwappedItems(Index1 As Long, Index2 As Long) | Fired when an item is swapped with another item in the group. |

Groups

Groups is a collection of group objects.

TABLE 7

Methods

| | |
|---|---|
| Sub ClearData( ) | Removes all of the group objects in the collection. |

TABLE 7-continued

Properties

| | |
|---|---|
| Property Item(Key As Variant) As Group | Returns the requested Group object based upon the index or key value. |
| Property Count As Long | The number of Groups in the collection. |
| Property Parent As Item | Returns this Groups parent Item object. |

Table

The Table object provides services to store, search, and retrieve values based upon a row and column.

TABLE 8

Methods

| | |
|---|---|
| Sub AddColumn(Key As String) | Adds a new column to the table. |
| Function AddRow( ) As Row | Creates a new row and adds it to the table. |
| Sub MakeIndex(Column As String) | Creates an index that can be searched with SearchKeywords( ). |
| Sub ClearIndex( ) | Clears an index created with MakeIndex. |
| Function SearchKeywords(Value As String) As RowSet | Searches the index for the specified value, returns an enumerator on the found rows. |
| Function Lookup(LookupColumn As String, Value As Variant) As Boolean | Checks to see if the specified column value exists in the table. |
| Sub RemoveAllRows( ) | Removes all rows from the table. |
| Sub RemoveColumn(Key As String) | Removes the specified column from the table. |

Properties

| | |
|---|---|
| Property ColumnCount As Long | Returns the number of columns in the table. |
| Property RowCount As Long | Returns the number of rows in the table. |
| Property Key As String | Returns the Key or name of the table. |

Tables

Tables is a collection of Table objects.

TABLE 9

Methods

| | |
|---|---|
| Function Add(Key As String) As Table | Creates a new table and adds it to the collection. |
| Sub Remove(Key As Variant) | Removes the specified table from the collection. |
| Sub RemoveAll( ) | Removes all of the tables. |
| Sub AddReferenceTables(Tables As Tables) | Adds the tables that are part of the passed in tables to this tables collection. This is used to combine multiple tables collections. |
| Sub SaveToFileStream(File As String, Stream As String) | Saves all of the tables to an OLE Structured Storage file. |
| Sub LoadFromFileStream(File As String, Stream As String) | Loads previously stored tables from an OLE Structured Storage file. |

Properties

| | |
|---|---|
| Property Item(Key As Variant) As Table | Returns the requested Table object based upon the index or key value. |
| Property Count As Long | The number of Groups in the collection. |

Wiew

The View object controls the canvas on which the user interface is painted. It contains a Panes collection upon which all other controls are added.

TABLE 10

Methods

| | |
|---|---|
| Sub Display(Item As Item, Tables As Tables, hWnd As Long, x As Long, y As Long, cx As Long, cy As Long) | Connects to pItem and pTables and displays the view on hWnd. When finished, call Hide( ). |
| Sub Hide( ) | Terminates a viewing session started with Display. |
| Sub Move(x As Long, y As Long, cx As Long, cy As Long) | Moves the client area of the View to the new coordinates. |
| Sub DEAdvise(Disp As Object) | Receives an OLE automation dispatch interface pointer that is called back by the item whenever changes occur. This allows the support of "Dynamic Events" that are events based upon the names of fields, controls, groups, etc. |
| Sub DEUnadvise(Disp As Object) | Prevents any previously set "Dynamic Event" object from being notified. |
| Sub SaveToFileStream(File As String, Stream As String) | Saves the view definition to an OLE Structured Storage file. |
| Sub LoadFromFileStream(File As String, Stream As String) | Loads a previously stored view definition from an OLE Structured Storage file. |
| Sub SetMargins(Left As Long, Top As Long, Right As Long, Bottom As Long) | Defines the viewing margins for the document. |
| Sub NextPrompt( ) | Moves focus to the next prompt in the view. |
| Sub PrevPrompt( ) | Moves focus to the previous prompt in the view. |
| Sub NextPane( ) | Displays the next pane in the view. |
| Sub PrevPane( ) | Displays the previous pane in the view. |

Properties

| | |
|---|---|
| Property Panes As Panes | Returns a reference to the Panes collection. Each pane defines a new "tab" in the view. A view must have at least one pane. |
| Property FocusControl As IActivePaperControl | Returns the AP control that currently has focus. |
| Property Colors(ci As COLOR_INDEX) As Long | Sets the color for the various controls that are part of the view. |
| Property AutoFit As Boolean | Specifies the way that prompts are displayed on the screen. If AutoFit is off, all prompts appear on a new line, otherwise, prompts are arranged so that they fill the view area. |
| Property HideImages As Boolean | Specifies whether ImageView controls should be visible or hidden in this view |
| Property ControlSpacing As Long | Specifies the amount of vertical and horizontal spacing there should be between controls. |

Events

| | |
|---|---|
| Dynamic Events | All view events are dynamic. |

GroupView

The GroupView is a control that displays a visual representation of a logical grouping of fields. It also contains a collection of Itemview objects. Each Itemview represents a group from the Item passed to the view.

TABLE 11

Methods

| | |
|---|---|
| Function AddControl(ProgID As String, [Key As Variant]) As IactivePaperControl | Adds a control the GroupView. The control must support the IActivePaper interface. |
| Sub RemoveControl(Key As Variant) | Removes a control from the GroupView. |

TABLE 11-continued

Properties

| | |
|---|---|
| Property GroupName As String | Gets/Sets the name of the group that this GroupView should attach to when displaying. |
| Property Group As Group | Retrieves the GroupView's attached group from the Item object passed to the View. |
| Property NewBarText As String | Gets/Sets the caption that appears in the 'New Bar' |
| Property ItemView(Index As Long) As ItemView | Returns the requested Pane object based upon the index or key value. |
| Property ItemViewCount As Long | Returns the number of ItemView objects in the collection. This number represents the number of Items in the Group. |

TextView

The TextView control displays a prompt description and an entry line where field data is entered.

TABLE 12

Methods

| | |
|---|---|
| Sub DoVerb(Verb As Variant) | A "verb" is some action that can take place on the control. Typical verbs include "Cut", "Copy", "Paste", and "Delete". |

Methods

| | |
|---|---|
| Sub SetCodeTable(Table As String, DataColumn As String, DisplayColumn As String) | Associates a code table, from the Tables collection passed to the view, with this control. If a table is associated with this control, a listbox is displayed to help the user select appropriate choices. |
| Sub EnsureVisible( ) | Calling method ensures that the control is currently visible in the view. |

Properties

| | |
|---|---|
| Property Field As Field | Returns a reference to the field object associated with this control. |
| Property MinEditWidth As Long | Defines the minimum size of the edit box displayed in the view. |
| Property Prompt As String | The prompt text. |
| Property ReadOnly As Boolean | Defines whether or not the user can modify information in this field. |
| Property Focus As Boolean | Setting focus to true forces the input focus to be moved from the currently active control to this TextView. It can also be set to false to remove focus from this control. |
| Property Required As Boolean | Specifies whether or not data is required in this field. |
| Property Underline As UNDERLINE_TYPE | Specifies the type of underline that is displayed under the control data. Possible values include, Normal, Red Wavey, and Blue Wavey. The different underline styles are designed to give visual clues to the user indicating that additional information may be required on the field. |

Events

| | |
|---|---|
| Event Changed( ) | Fired every time that data changes in the field. |

Events

| | |
|---|---|
| Event Error(Error As ERRORTYPE, Index As Long) | Fired if information entered into the field doesn't meet the basic data type, or required state requirements of the field. |

Pane

A pane object represents each user interface "Tab" control. Every view must have at least one pane.

TABLE 13

Methods

| | |
|---|---|
| Function AddControl(ProgID As String, [Key As Variant]) As IActivePaperControl | Adds a control the pane. The control must support the IActivePaper interface. |
| Sub RemoveControl(vKey) | Removes a control from the pane. |
| Sub EnsureVisible( ) | Ensures that the pane is visible. |

Properties

| | |
|---|---|
| Property Item(Key As Variant) As IActivePaperControl | Returns a reference to the requested control. |

Panes

Panes is a collection of Pane objects.

TABLE 14

Methods

| | |
|---|---|
| Function Add(Key As String) As Pane | Adds a pane to the collection. |
| Sub Remove(Key as Variant) | Removes a pane from the collection. |

Properties

| | |
|---|---|
| Property Item(Key as Variant) As Group | Returns the requested Pane object based upon the index or key value. |
| Property Count As Long | The number of Panes in the collection. |

What is claimed is:

1. A method of entering, storing, displaying, and retrieving data using a data management system having a display device, one or more input devices, and a storage device, said method comprising:

(a) loading a document containing data from the storage device;

(b) loading a template containing format instructions and at least one data field from the storage device, each data field having a size that is not limited by the data management system;

(c) linking the document with the template; and (d) displaying the document and the data within the document responsive to the template on the display device as specified by the format instructions.

2. The method of entering, storing, displaying, and retrieving data according to claim 1, further comprising the steps of:

(a) loading, prior to the displaying step, a client script program;

(b) entering, after the displaying step, by a user, additional data having size and format;

(c) validating, via the client script program, at least one of the size and format of the data; and (d) adjusting, via the client script program, the data to result in valid data.

3. The method of entering, storing, displaying, and retrieving data according to claim 1, wherein the format instructions create one or more fields which are displayed on the display device, the one or more fields having field identifications, formats and locations, the data having data identifications, and wherein the linking step links data to fields where the data identifications and field identifications at least one of substantially and logically match.

4. The method of entering, storing, displaying, and retrieving data according to claim 3, wherein said method further comprises the steps of:

(a) determining, via the client script program, the data fields that are relevant based on the additional data and predetermined criteria; and (b) modifying, on the display device, the displayed data by at least one of hiding, deactivating and removing the data fields that are not relevant.

5. The method of entering, storing, displaying, and retrieving data according to claim 4, further comprising the step of modifying, by the client script program, on the display device, the locations of the data fields.

6. The method of entering, storing, displaying, and retrieving data according to claim 3, wherein said method further comprises the steps of:

(a) identifying the data fields which require entry of the additional data;

(b) identifying the additional data which requires validation; and (c) displaying a list of the data fields which require the entry of the additional data and the additional data which requires the validation.

7. The method of entering, storing, displaying, and retrieving data according to claim 1, wherein the data management device is one of a computer, a computer network, and a portable electronic device used over at least one of a local area network, a global network, the Internet, optionally using thin client processing.

8. The method of entering, storing, displaying, and retrieving data according to claim 1, wherein the document and the template each contain template codes in order to link at least one document with at least one template with at least substantially identical template codes.

9. The method of entering, storing, displaying, and retrieving data according to claim 1, further comprising the steps of:

(1) entering, by the user, a plurality of additional data;

(2) validating, by the computer, that the plurality of additional data is in substantial conformance with a predetermined format, as the user enters the plurality of additional data;

(3) when the plurality of additional data is not in conformance with the predetermined format, creating a "to do list" for review and correction by the user at a later time; and (4) repeatedly performing said steps (1)–(3), continuously adding to the "to do list", and allowing the user to continue to enter the plurality of additional data.

10. The method of entering, storing, displaying, and retrieving data according to claim 1, further comprising the step of entering, by the user, a plurality of additional data in accordance with a free form data entry format, the free form data format including unlimited field sizes, and the user not being restricted in size of an entry for a particular field.

11. The method of entering, storing, displaying, and retrieving data according to claim 1, further comprising the steps of:

(1) entering, by the user, a plurality of additional data, the plurality of additional data including multiple groups with multiple entries of data for a substantially same field or substantially same set of fields;

(2) managing, by the data management system, the plurality of the additional data including the multiple groups with the multiple entries of data in at least one of a single document, single logical document and file, by maintaining each of the multiple entries directly after each other corresponding with each of the multiple groups.

12. The method of entering, storing, displaying, and retrieving data according to claim 11, further comprising the step of displaying only the field in the substantially same field or the substantially same set of fields corresponding to the entry selected by the user.

13. The method of entering, storing, displaying and retrieving data according to claim 11, further comprising the step of entering by the user a number of entries having a size that is not limited by the data management system into at least one of the multiple groups.

14. The method of entering, storing, displaying, and retrieving data according to claim 1, further comprising the steps of:
   (1) entering, by the user, a plurality of additional data, the plurality of additional data including multiple groups with multiple entries of data;
   (2) linking a word processing program to the data management system;
   (3) transmitting the plurality of additional data from the data management system to the word processing program, wherein each of the groups is an instance of a data object in an object oriented programming environment; and
   (4) formatting by the word processing program the plurality of additional data for at least one of print previewing, printing and displaying, including converting each instance of each of the groups into separate data representative of each of the groups.

15. The method of entering, storing, displaying, and retrieving data according to claim 1, further comprising the steps of:
   (1) entering, by the user, a plurality of additional data, the plurality of additional data including multiple groups with multiple entries of data;
   (2) linking a word processing program to the data management system;
   (3) transmitting the plurality of additional data from the data management system to the word processing program; and
   (4) formatting by the word processing program the plurality of additional data for at least one of print previewing, printing and displaying, including converting each of the multiple entries of the multiple groups into separate formatted data representative of each of the multiple groups.

16. The method of entering, storing, displaying, and retrieving data according to claim 1, wherein the data comprises one or more of digitized text and digitized images.

17. A method of entering, storing, displaying, and retrieving data using a data management system having a display device, one or more input devices, and a storage device, said method comprising the steps of:
   (1) entering, by the user, a plurality of the data;
   (2) validating, by the computer, that the plurality of the data is in substantial conformance with a predetermined format, as the user enters the plurality of the data;
   (3) when the plurality of the data is not in conformance with the predetermined format, creating a "to do list" for review and correction by the user at a later time; and
   (4) repeatedly performing said steps (1)–(3), continuously adding to the "to do list", and allowing the user to continue to enter the plurality of the data, even though previously the plurality of data is not in conformance with the predetermined format.

18. A method of entering, storing, displaying, and retrieving data using a data management system having a display device, one or more input devices, and a storage device, said method comprising the steps of:
   (1) entering, by the user, a plurality of the data including multiple groups with multiple entries of data for a substantially same field or substantially same set of fields;
   (2) managing, by the data management system, the plurality of the data including the multiple groups with the multiple entries of data in at least one of a single document, single logical document and file, by maintaining each of the multiple entries directly after each other corresponding with each of the multiple groups; and
   (3) displaying only the field in the substantially same field or the substantially same set of fields corresponding to the entry selected by the user.

19. A method of entering, storing, displaying, and retrieving data using a data management system having a display device, one or more input devices, and a storage device, said method comprising the steps of:
   (1) entering, by the user, a plurality of the data, the plurality of the data including multiple groups with multiple entries of data;
   (2) linking a word processing program to the data management system;
   (3) transmitting the plurality of the data from the data management system to the word processing program; and
   (4) formatting by the word processing program the plurality of the data for at least one of print previewing, printing and displaying, including converting each of the multiple entries of the multiple groups into separate formatted data representative of each of the multiple groups.

20. A data management system executing the processes in accordance with one of claims 1, 17, 18 or 19.

21. A computer readable tangible medium storing the processes in accordance with one of claims 1, 17, 18 or 19, to be executed by a data management system.

22. A method of entering, storing, displaying, and retrieving data using a data management system having a display device, one or more input devices, and a storage device, said method comprising:
   (a) loading a document containing data and a document code from the storage device;
   (b) identifying a template containing format instructions, at least one data field having unlimited size and a template code, based on correspondence of the document code and the template code;
   (c) loading the template from the storage device;
   (d) linking the document with the template; and
   (e) displaying the document and the data within the document responsive to the template on the display device as specified by the format instructions.

23. A method of entering, storing, displaying, and retrieving data using a data management system having a display device, one or more input devices, and a storage device, said method comprising:
   (a) entering, by the user, a plurality of data through one or more data fields of a template containing format instructions;

(b) identifying, by the data management system, a document corresponding to the data entered by the user;
(c) linking the document with the template;
(d) creating a new document that contains the data entered by the user and relevant data from the identified document; and
(e) displaying, by the data management system, the new document and the data within the new document responsive to the template on the display device as specified by the format instructions.

* * * * *